(12) United States Patent
Yeum (10) Patent No.: US 8,485,575 B2
(45) Date of Patent: Jul. 16, 2013

(54) GRIPPER FOR DOOR OF VEHICLE

(75) Inventor: Jung Whan Yeum, Seoul (KR)

(73) Assignee: Hyundai Motor Company, Seoul (KR)

( * ) Notice: Subject to any disclaimer, the term of this patent is extended or adjusted under 35 U.S.C. 154(b) by 238 days.

(21) Appl. No.: 12/959,747

(22) Filed: Dec. 3, 2010

(65) Prior Publication Data

US 2012/0056440 A1     Mar. 8, 2012

(30) Foreign Application Priority Data

Sep. 6, 2010   (KR) .................. 10-2010-0087111

(51) Int. Cl.
  *B25J 15/00* (2006.01)
  *B66C 1/44* (2006.01)
(52) U.S. Cl.
  USPC ......... 294/81.6; 294/81.2; 29/281.1; 269/905
(58) Field of Classification Search
  USPC ......... 294/81.6, 81.2, 86.4, 197, 198; 269/32, 269/45, 905; 29/281.1, 771, 787, 795, 434, 29/464; 901/30, 31, 32, 37
  See application file for complete search history.

(56) References Cited

U.S. PATENT DOCUMENTS

| | | | | |
|---|---|---|---|---|
| 4,565,400 A | * | 1/1986 | Nakashima et al. | 294/197 |
| 4,627,158 A | * | 12/1986 | Mitoh | 29/771 |
| 5,179,774 A | * | 1/1993 | Massie | 29/235 |
| 8,061,748 B2 | * | 11/2011 | Kipping et al. | 294/106 |
| 8,256,811 B2 | * | 9/2012 | Yeum et al. | 294/86.4 |
| 2006/0013646 A1 | * | 1/2006 | Baulier et al. | 901/27 |
| 2011/0135436 A1 | * | 6/2011 | Yeum et al. | 414/729 |

FOREIGN PATENT DOCUMENTS

| | | |
|---|---|---|
| KR | 10-2005-0005842 A | 1/2005 |
| KR | 10-2009-0053078 A | 5/2009 |

* cited by examiner

*Primary Examiner* — Paul T Chin
(74) *Attorney, Agent, or Firm* — Edwards Wildman Palmer LLP; Peter F. Corless

(57) ABSTRACT

A gripper for a door of a vehicle is provided which may be applied to various types of vehicles. In particular, a gripper for a door of a vehicle as provided may include frames mounted to an end of an arm of a robot, moving units which are disposed on the frames and are configured for reciprocating toward a clamping point of a door panel, angle adjusting units disposed to an end of the moving unit and configured for reciprocating forward and backward with respect to the frame and adjustable according to an angle difference of the door panel, and clamping units which are disposed on each angle adjusting unit and configured for clamping the clamping points of the door panel.

11 Claims, 11 Drawing Sheets

FIG. 1

PRIOR ART

FIG. 2

PRIOR ART

FIG. 3

PRIOR ART

GRIPPER FOR DOOR OF VEHICLE

CROSS-REFERENCE TO RELATED APPLICATION

This application claims priority to and the benefit of Korean Patent Application No. 10-2010-0087111 filed in the Korean Intellectual Property Office on Sep. 6, 2010, the entire contents of which are incorporated herein by reference.

BACKGROUND OF THE INVENTION (a) Field of the Invention

The present invention generally relates to a door gripper for a vehicle. More particularly, the present invention relates to a door gripper for a vehicle which is configured to correspond to an angle difference of restricted cross sections and height and width differences of restricted cross sections of a door of a vehicle to be applied to a various types of doors.

(b) Description of the Related Art

Figure 1:
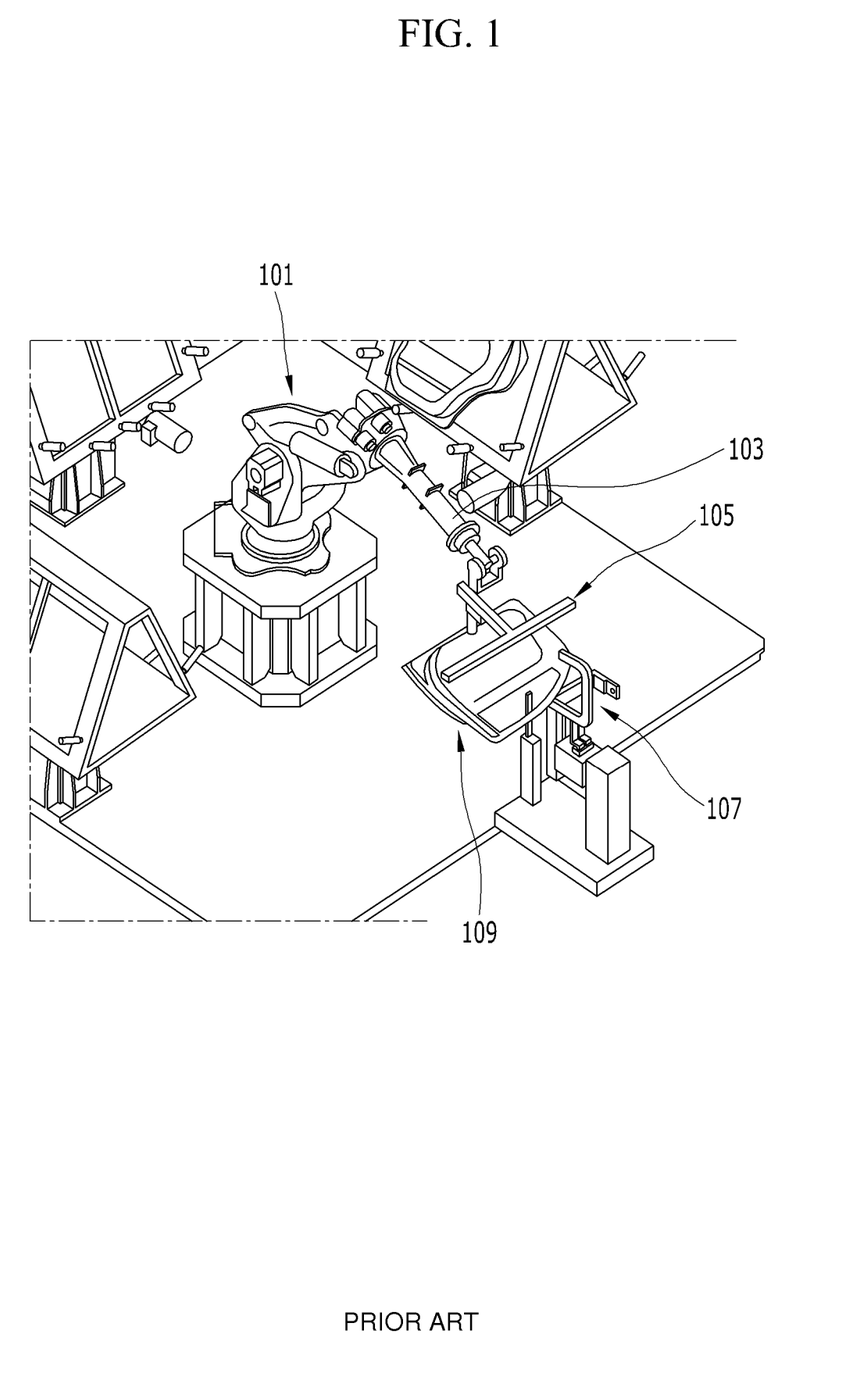
FIG. 1 is a view illustrating a door welding process using a conventional door gripper.

During vehicle assembly, grippers, such as a door gripper 105 as shown in FIG. 1, are mounted at the end of an arm 103 of a robot 101, which is also called a robot gripper. Such grippers are used to carry vehicle body parts from one process to the next or hold vehicle body parts in position for welding by a welder in the vehicle body assembly line. For example, as shown in the FIG. 1, a gripper 105 can be used with a welding device 107 and vehicle body parts such as a door panel 109.

Figure 2:
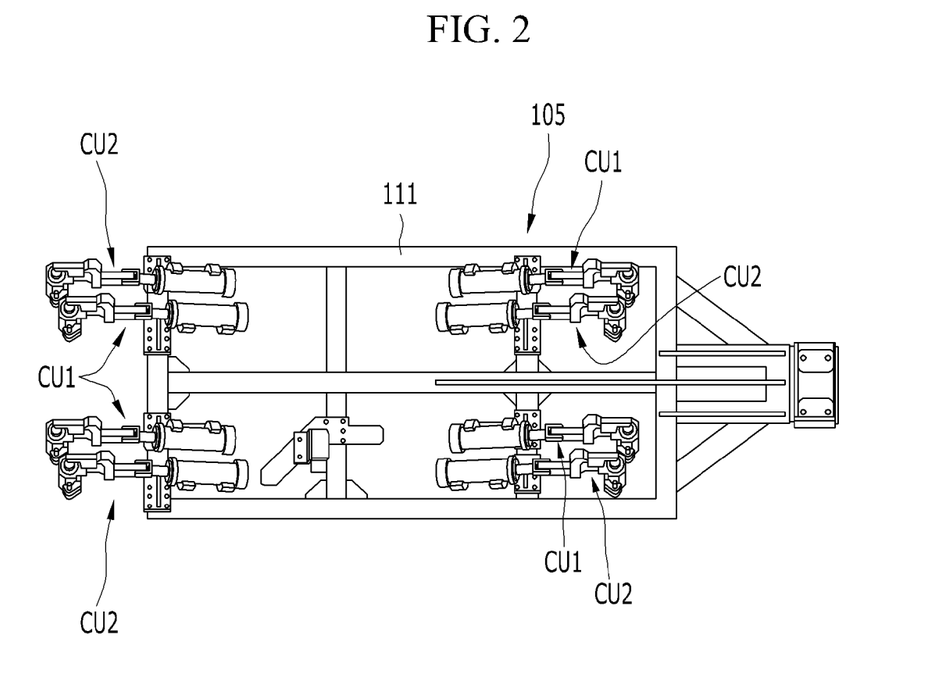
FIG. 2 is a perspective view of a common door gripper.
Figure 3:
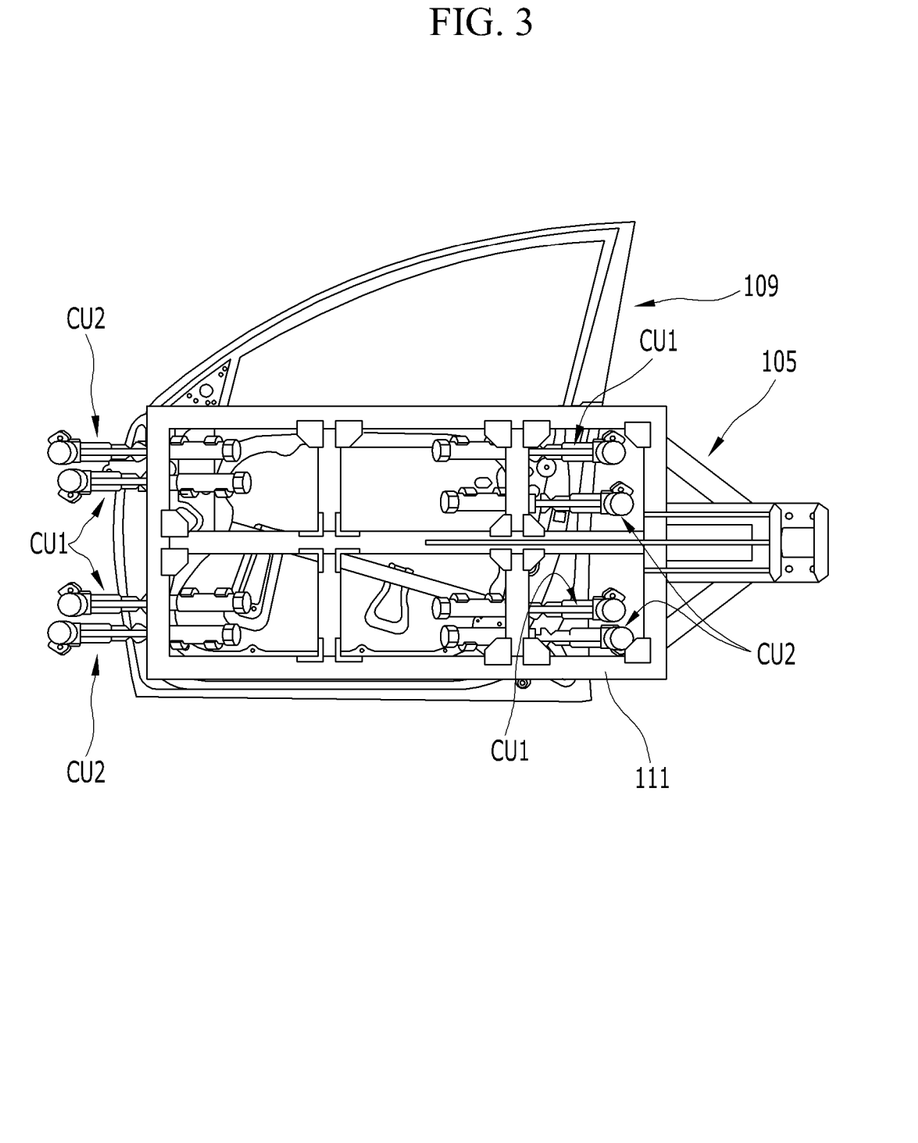
FIG. 3 is a view illustrating the use of a conventional door gripper.

FIG. 2 is a perspective view of a common door gripper and FIG. 3 is a view illustrating the use of common door gripper. As shown, a conventional door gripper includes a frame 111 mounted to the end of an arm 103 of the robot 101, and includes two sets of clamping units CU1 and CU2.

However, with such conventional the door grippers 105, complications are presented when the angle and/or height of restricted cross sections of various vehicle parts differ, the shape of the restricted cross section for each vehicle is complex, and when interference with the existing equipment must be prevented. In order to address those complications, it is required to manufacture a new gripper in its entirety for each new type of vehicle.

Consequently, when exclusive grippers must be provided for each new type of vehicle, the investment costs increase because the existing gripper must either be modified or an entirely new gripper must be manufactured. In addition to the added costs, the structure of the gripper generally becomes gradually more complicated.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention features a door gripper for a vehicle which is particularly advantageous because it is adaptable for use with various types of vehicles.

According to one embodiment of the present invention, a gripper for a door of a vehicle may include frames mounted to an end of a robot arm, moving units which are disposed in the frame and which may reciprocate toward a clamping point of a door panel, angle adjusting units disposed at or near an end of the moving unit which can reciprocate forward and backward with respect to the frame and which can adjust according to an angle difference of the door panel, and clamping units which are disposed in connection with each angle adjusting unit and which clamp the clamping points of the door panel.

In various embodiments, the frame may include two upper frames and a lower frame, and in certain embodiments the frames may be disposed as "Y" shape.

In an exemplary embodiment, the upper and lower frames may be disposed such that they are disposed at an angle of about 120° with respect to the adjacent frame.

In accordance with various embodiments, the moving unit may include a main body which is disposed on each frame which has one or more slide holes formed therein; a rod (e.g. an LM rod, "linear motion" rod) or the like which is inserted into the slide hole from an end of the main body and which has an end in connection with the angle adjusting unit; and a drive motor which is disposed on the main body, for example it can be disposed at an end opposite the end at which the moving unit is mounted, the drive motor being in connection with the other end of the rod (LM rod)(i.e. the end not connected to the angle adjusting unit), and which selectively moves the rod (e.g. LM rod) to be reciprocated.

According to various embodiments, the rod (e.g. LM rod) may include at least one guide rail disposed on the exterior circumference of the rod and along the length (longitudinal direction) of the rod.

In various embodiments, the main body may include a rail groove formed at an interior circumference of the slide hole and corresponding to the guide rail.

In some embodiments, the angle adjusting unit may include an air brake, or the like, which comprises a brake shaft and is in connection with the end of the rod (e.g. LM rid); a swivel joint unit which is rotatably connected to an end of the air brake and having the clamping unit mounted thereto; and a spring or the like disposed on the brake shaft for supplying elastic force to the swivel joint unit.

In various embodiments, the swivel joint unit may include a mounting block on which the clamping unit is mounted to an exterior circumference thereof; guide blocks disposed on the mounting block, wherein the guide blocks are spaced apart from each other; a rotation block which is disposed between the guide blocks and which is pivotable around a hinge shaft, which contacts the mounting block, and is rotatably in connection with the brake shaft; and a stopper which is disposed so as to prevent the mounting block from rotating over a predetermined angle.

In some embodiments, the rotation block may include a contacting surface formed as a round or rounded shape.

In some embodiments, the stopper may include an insert protrusion which is disposed on the guide block and which selectively protrudes according to the supply of hydraulic pressure, and a slot which is formed in the rotation block such that the insert protrusion can be selectively inserted therein.

In certain embodiments, the insert protrusion and the slot may be formed as a round or rounded shape.

In various embodiments, the clamping unit may include a locator having an end connected to the mounting block of the swivel joint unit, a clamping cylinder which comprises a rod and which is hingedly connected to the locator, and a clamper which is hingedly connected to an end of the locator and an end of the clamping cylinder rod.

In some embodiments, the locator and the clamper may include respectively a rotation pad for clamping the clamping point of the door panel, and a swivel ball rotatably supporting the rotation pad.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

<Description of symbols>

| | |
|---|---|
| 1 . . . door panel | 110 . . . frame |
| 120 . . . moving unit | 121 . . . main body |
| 125 . . . LM rod | 129 . . . drive motor |
| 130 . . . angle adjusting unit | 131 . . . air brake |
| 135 . . . swivel joint unit | 137 . . . mounting block |
| 139 . . . guide block | 141 . . . rotation block |
| 143 . . . hinge shaft | 145 . . . stopper |
| 146 . . . insert protrusion | 147 . . . slot |
| 149 . . . spring | 150 . . . clamping unit |
| 151 . . . locator | 153 . . . clamper |
| 155 . . . swivel ball | 157 . . . rotation pad |
| CY . . . clamping cylinder | R . . . rod |

DETAILED DESCRIPTION OF THE EMBODIMENTS

An exemplary embodiment of the present invention will hereinafter be described in detail with reference to the accompanying drawings.

For a fuller understanding of the nature and desired objects of the present invention, reference is made to the following detailed description taken in conjunction with the accompanying drawing figures wherein like reference characters denote corresponding parts throughout the several views.

The descriptions of specific exemplary embodiments of the present invention have been presented for purposes of illustration and description. They are not intended to be exhaustive or to limit the invention to the precise forms disclosed, and obviously many modifications and variations are possible in light of the above teachings.

Referring to the drawings, a gripper 100 of a door for a vehicle according an exemplary embodiment of the present invention includes frames 110 mounted to an end of an arm of a robot, moving units 120 which are disposed on the frame 110, angle adjusting units 130 disposed on an end of the moving unit, and clamping units 150 which are disposed on each angle adjusting unit 130. In particular, the moving units 120 are configured so as to be able to reciprocate toward a clamping point P1, P2 and P3 of a door panel 1 (see FIG. 4). Further, the angle adjusting units 130 are disposed so as to be able to reciprocate forward and backward with respect to the frame 110 and so as to adjust according to an angle difference of the door panel 1. Further, clamping units 150 are disposed such that they can clamp each clamping point P1, P2 and P3 of the door panel 1.

The gripper 100 according to the exemplary embodiment of the present invention can carry vehicle body parts, for example the door panel 1, from one process to the next process, and/or can fix the vehicle body parts for welding by a welder in the vehicle body assembly line.

Figure 4:
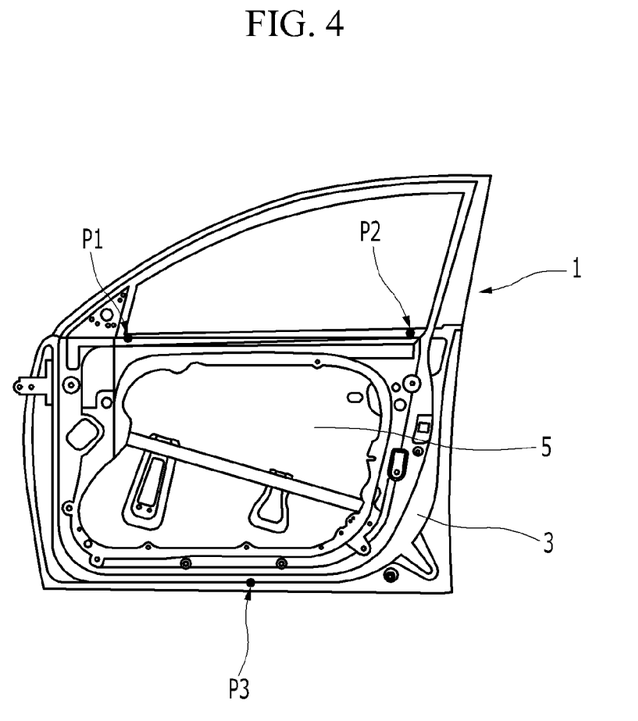
FIG. 4 is a drawing illustrating clamping points of a gripper of a door for a vehicle according an exemplary embodiment of the present invention.

The gripper 100 according to the present invention, as shown in FIG. 4, carries the door panel 1 temporarily assembled as an inner panel 3 and an outer panel 5 from one process to the next process and/or fixes the vehicle body parts for welding by a welder or hemming process in the vehicle body assembly line.

For example, as shown in FIG. 4, two clamping points are provided as upper clamping points P1 and P2, and one clamping point is provided as a lower clamping point P3.

Figure 5:
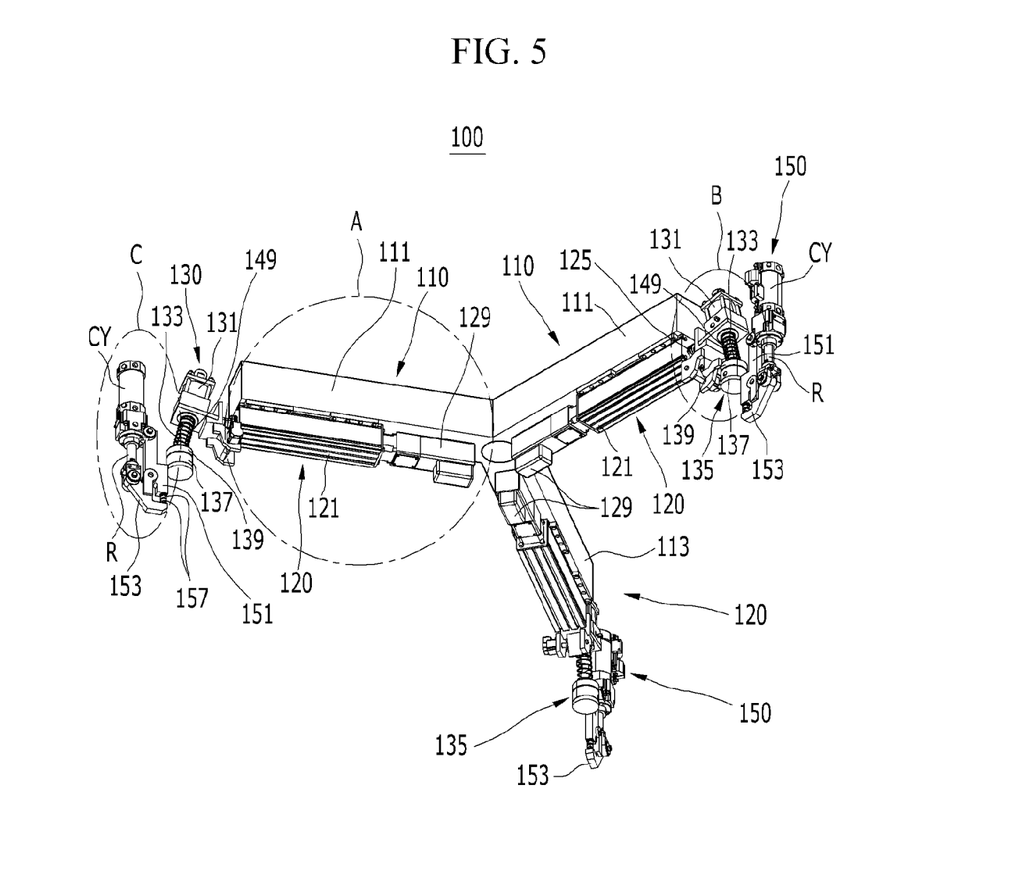
FIG. 5 is a perspective view of a gripper of a door for a vehicle according an exemplary embodiment of the present invention.

The gripper 100 according to an exemplary embodiment of the present invention, as shown in FIG. 5, can be connected to an arm of a robot (not shown) through a rear portion of the frame 110. Details with respect to how the frame 110 is connected to a robot arm are not particularly limited, and can be in accordance with any conventional arrangements.

As shown in this embodiment, the gripper 100 includes the frame 110, the moving unit 120, the angle adjusting unit 130 and the clamping unit 150. Those parts will hereinafter be described in further detail in connection with exemplary embodiments of the present invention.

According to an embodiment, e.g. as shown in FIG. 5, the frames 110, on which the other parts are disposed (e.g. moving unit angle adjusting unit, clamping unit) comprise two upper two upper frames 111 and one lower frame 113. The frames are preferably disposed with respect to each other at a predetermined angle. For example, in one preferred embodiment, the predetermined angle is about 120°. In an exemplary embodiment, as shown in FIG. 5, the frames 110 are disposed as a "Y" shape. A center of the rear portion of the "Y" shape can be connected to an arm of a robot (not shown).

As shown, the moving units 120 are disposed on the frame 110, and they are configured so as to be capable of reciprocating between the clamping points P1, P2 and P3 of a door panel 1 and the center of the frames 110.

Figure 6:
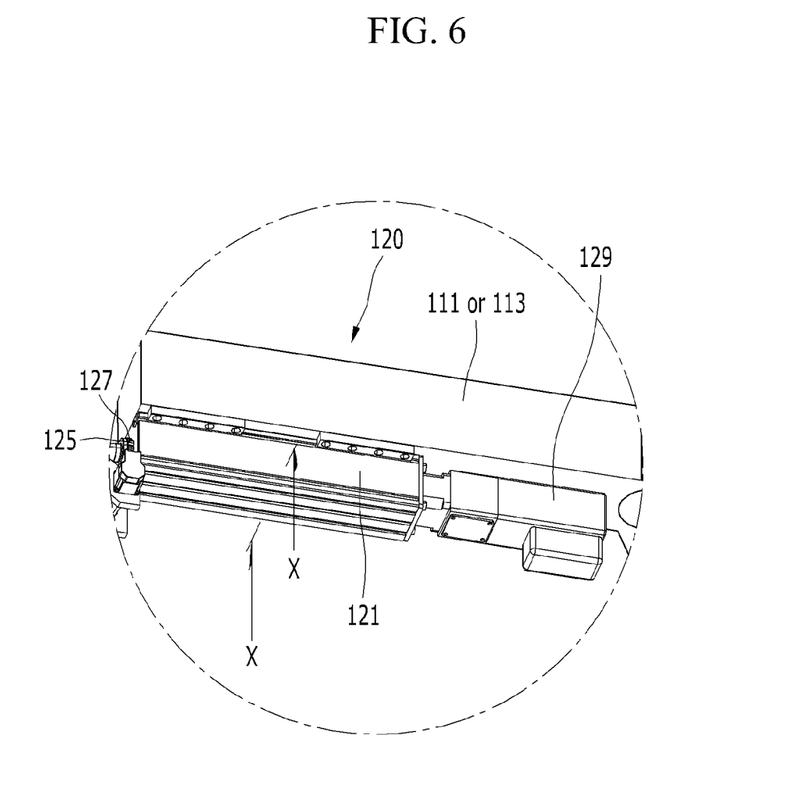
FIG. 6 is an enlarged view of "A" of FIG. 5.

As shown in FIG. 6, the moving units 120 can include a main body 121, an LM rod 125 and a drive motor 129.

Figure 7:
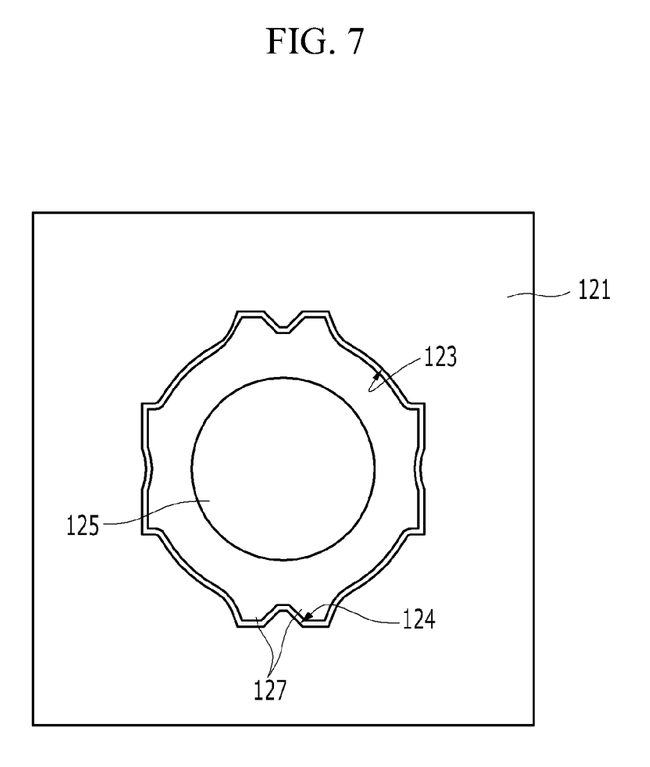
FIG. 7 is a cross-sectional view along line X-X of FIG. 6.

The main bodies 121 are disposed on each upper and lower frame 111 and 113, and as shown in FIG. 7 a slide hole 123 can be formed therewithin. The LM rod 125 can be slidably inserted into the slide hole 123 from an end of the main body 121, and one end of the LM rod 125 is connected to the angle adjusting unit 130.

As shown, the drive motor 129 is disposed at the other end of the main body 121 in connection with the other end of the LM rod 125, and selectively moves the LM rod 125 to be reciprocated.

As shown in FIG. 7, the LM rod 125 in some embodiments include at least one guide rail 127 formed to an exterior circumference of the LM rod 125 along length direction of the LM rod 125. Further, the main body 121 can include a rail groove 124 formed at an interior circumference of the slide hole 123 corresponding to the guide rail 127.

In the exemplary embodiment shown in FIG. 7, four guide rails 127 are formed to the exterior circumference of the LM rod 125, and also four rail grooves 124 are formed at the interior circumference of the slide hole 123.

However, while four the guide rails 125 and the rail grooves 124 are described in this exemplary embodiment, the present invention is not limited as such.

According to the present invention, the guide rails 127 and the rail grooves 124 may be provided so as to prevent rotation of the angle adjusting unit 130 by preventing the LM rod 125 from rotation when the LM rod 125 moves forward and backward within the main body 121 by the drive motor 129.

Thus, while the angle and/or height of restricted cross sections of a door panel (clamping points) are different for each vehicle, and/or while the shape of the restricted cross section may be complicated for each vehicle, the moving unit 120 of the present invention may be adjusted by moving the LM rod 125.

In the present exemplary embodiment, the angle adjusting unit 130 is mounted to an end of the each moving unit 120 and is configured to be movable along the forward and backward direction with respect to the frame 110. The angle adjusting unit 130 can be configured so as to adjust the angle corresponding to differences of the angle of restricted cross sections of the door panel (clamping points).

Figure 8:
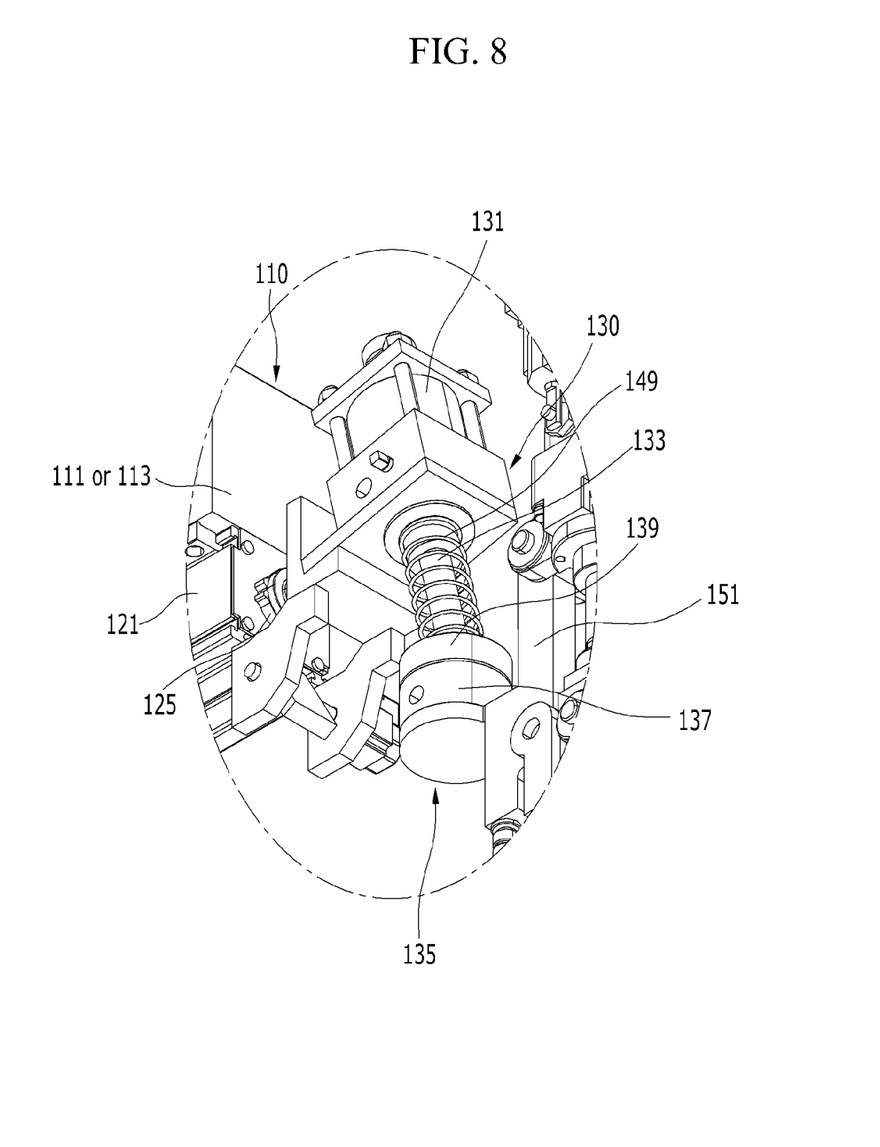
FIG. 8 is an enlarged view of "B" of FIG. 5.

For example, in the angle adjusting unit 130 shown in FIG. 8, an air brake 131, a swivel joint unit 135 and a spring 149 are provided. In particular, the air brake 131 can include a brake shaft 133 and is connected to an end of the LM rod 125. The air brake 133 moves the brake shaft 133 forward and backward to adjust the distance between the door panel 1 and the clamping unit 150. As shown, the swivel joint unit 135 is connected to an end of the brake shaft 133, and the clamping unit 150 is mounted to a side of the swivel joint unit 135.

Figure 9:
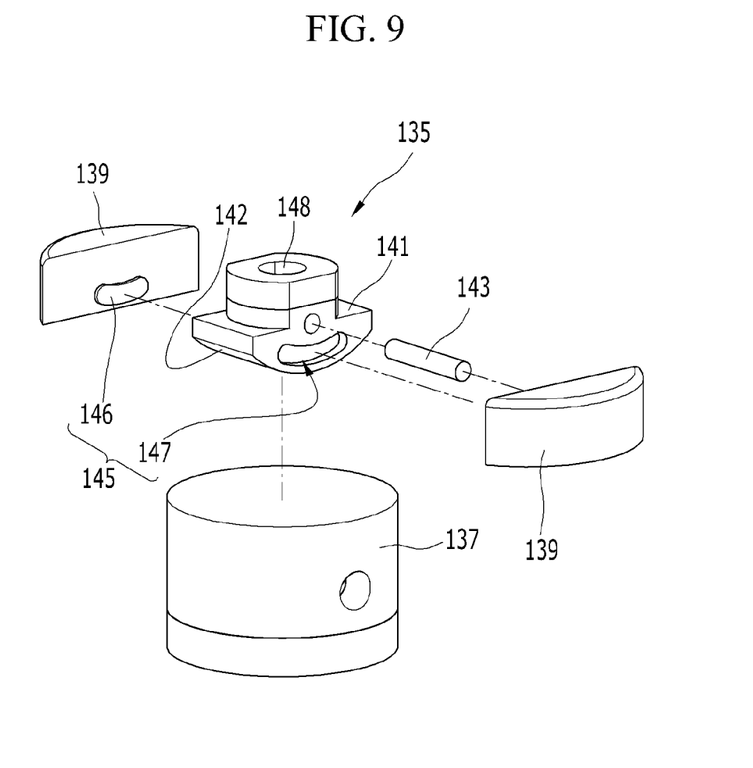
FIG. 9 is an exploded perspective view of a swivel joint unit of a door for a vehicle according an exemplary embodiment of the present invention.

As shown in FIG. 9, the swivel joint unit 135 can include a mounting block 137, a guide block 139, a rotation block 141 and a stopper 145. The mounting block 137 can be provided in any suitable shape. For example, as shown, the mounting block 137 can be formed as a circular cylindrical shape, and the clamping unit 150 can be mounted to an exterior circumference of the mounting block 137. The guide blocks 139 are disposed to the mounting block 137 and are spaced apart from each other. The configuration and shape of the guide blocks 139 is not particularly limited, and in certain embodiments, for example as shown in FIG. 9, the guide blocks 139 may be formed as a semi-circular cylinder shape corresponding to the shape of the mounting block 137. Of course any other suitable combination of mounting block 137 and guide block 139 shapes could also be used and could be readily determined by one of skill in the art As further shown in FIG. 9, a rotation block 141 is disposed between the guide blocks 139 and is pivotable around a hinge shaft 143. In particular, as shown, the rotation block 141 contacts the mounting block 137 and is rotatably connected to the brake shaft 133 through a rotation block hole 148 or the like formed in the rotation block 141. Angle differences between the clamping unit 150 and the door panel 1 may, thus, be suitably adjusted by selectively rotating the mounting block 137.

In some embodiments, it is preferable that a contact portion 142 of the rotation block 141 which contacts the mounting block 137 is formed as a round or rounded shape, and the mounting block 137 rotates along the contact portion 142 of the rotation block 141.

And such, each mounted angle of the clamping unit 150 may be adjusted by the swivel joint unit 135 corresponding to various angles of restricted cross sections in the door panel 1.

As shown in FIG. 9, the stopper 145 can be disposed and configured for preventing the mounting block 137 from rotating beyond a predetermined angle. As shown, the stopper 145 can include an insert protrusion 146 and a slot 147 or the like. The insert protrusion 146 can be suitably provided, such as disposed to a side of the guide block 139, and selectively protrudes from the guide block 139 according to supply of hydraulic pressure or other means. The slot 147 formed in the rotation block 141 is configured for the insert protrusion 146 to be selectively inserted therein, and thus rotation angle of the mounting block 137 may be adjusted. In some embodiments, the insert protrusion 146 and the slot 147 are preferably formed as a round or rounded shape corresponding to rotation of the rotation block 141.

Figure 10:
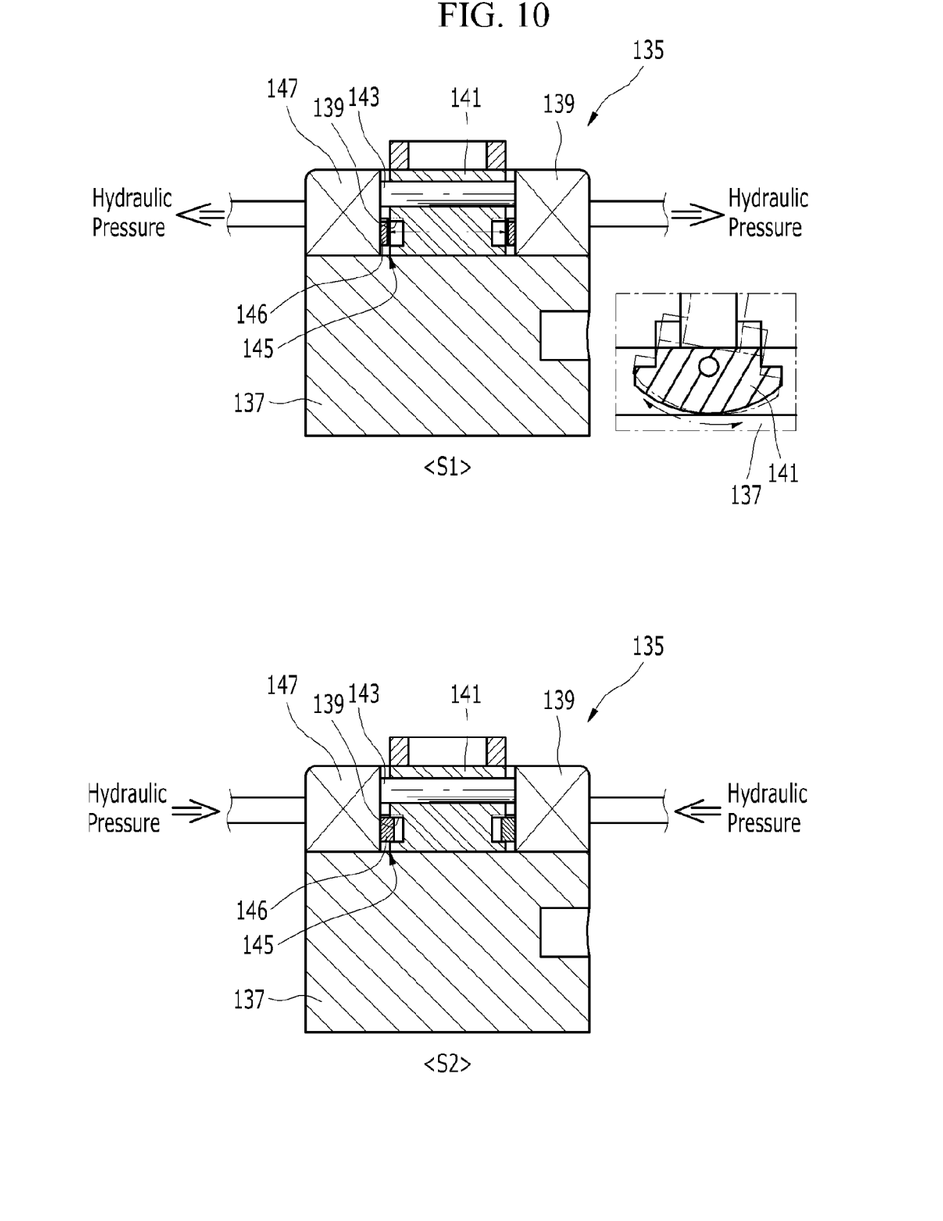
FIG. 10 is a view illustrated a swivel joint unit of a door for a vehicle according an exemplary embodiment of the present invention.

According to an embodiment of the present invention, when angle adjustment of the clamping unit 150 is desired, in the swivel joint unit 135 the hydraulic pressure is supplied to the guide block 139 and the insert protrusion 146 is inserted into the guide block 139 so as to release connection between the rotation block 141 and the guide block 139 (as shown in S1 of FIG. 10). After angle adjustment has been made between the rotation block 141 and the mounting block 137, as shown in S2 of FIG. 10, hydraulic pressure is supplied to the guide block 137 so as to push the insert protrusion 146 to protrude, and thus the insert protrusion 146 is inserted into the slot 147 to lock the mounting block 137.

Further, a spring 149 or the like can be disposed on the brake shaft 133 of the air brake 131 so as to supply elastic force to the swivel joint unit 135. The spring 149 pushes the swivel joint unit 135 to supply elastic force to the mounting block 137, fixed by the stopper 145, to be stable when the air brake 131 is not operating.

Figure 11:
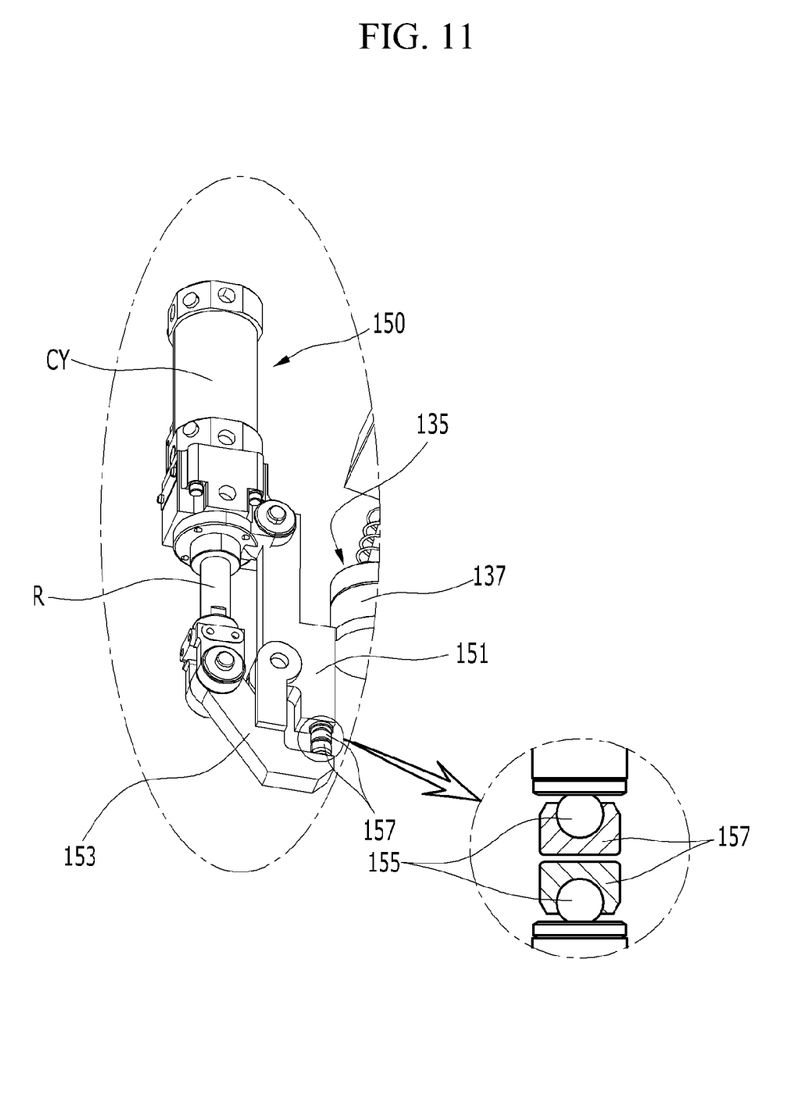
FIG. 11 is an enlarged view of "C" of FIG. 5.

The clamping unit 150 is mounted to each angle adjusting unit 130 to clamp the clamping points P1, P2, and P3 of the door panel 1. As shown in FIG. 11, a locator 151 of the clamping unit 150 can be mounted to the mounting block 137 of the swivel joint unit 135 forward of the frame 110. A clamping cylinder CY including a rod R can further be hingedly connected to the locator 151. A clamper 153 can be hingedly connected to the locator 151 and an end of the clamper 153 hingedly connected to an end of the rod R of the clamping cylinder CY. As such, the clamper 153 is pivotable around the connecting point of the locator 151 according to operation of the clamping cylinder CY.

As further shown in FIG. 11, the locator 151 and the clamper 153 can include a rotation pad 157 for clamping the clamping points P1, P2 and P3 of the door panel 1, and a swivel ball 155 rotatably supporting the rotation pad 157 to address angle differences of restricted cross sections.

The gripper 100 is operated by using the drive motor 129 or each moving unit 120 to move each LM rod 125 such that the clamping units 150 are positioned so as to correspond to clamping points, particularly the two upper clamping points P1 and P2 and the lower clamping point P3 of the door panel 1.

Then, each air brake 131 of the angle adjusting unit 130 moves the brake shaft 133 forward or backward as needed to adjust the distance between the door panel 1 and the clamping unit 150.

After releasing the stopper 145 of the swivel joint unit 135 to adjust the angle position of the clamping unit 150, hydraulic pressure is then supplied to the stopper 145 to fix the mounting block 137 of the swivel joint unit 135.

Each clamping cylinder CY of the clamping unit 150 is then operated to match the rotation pad 157 to the clamping points P1, P2, and P3. Then each clamping cylinder CY and the locator 151 clamp the clamping point P1, P2, and P3 of the door panel 1.

The clamping points P1, P2, and P3 of the door panel 1 are thereby gripped by each clamping unit 150 of the gripper 100.

As described above, the gripper 100 for a door of a vehicle according to the present invention may be configured to correspond to height and width differences of restricted cross sections (the clamping points P1, P2, and P3) of a door of a vehicle so as to be applied to various types of doors, by modulating the moving unit 120 and the angle adjusting unit 130 so as to adjust the position of the clamping unit 150.

The gripper 100 for a door of a vehicle according to the present invention may further be configured to correspond an angle difference of restricted cross sections (the clamping points P1, P2, and P3) by modulating the position of the rotation pad 157.

Thus, the gripper 100 for a door of a vehicle according to the present invention may be configured to correspond to an angle difference of restricted cross sections and height and width differences of restricted cross sections of a door of a vehicle, to therefor be applied to various types of doors. In particular, the gripper 100 of the present invention can be applied to various types of doors by modulating the moving unit 120, the angle adjusting unit 130 and the moving unit 120. Thus, the initial costs of manufacturing various types of vehicles may be reduced, and the entire system simplified.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A gripper for a door of a vehicle comprising:
    frames mounted to an end of an arm of a robot;
    moving units disposed on the frames and configured to be reciprocated toward a clamping point of a door panel;
    angle adjusting units disposed on an end of the moving unit and configured to be reciprocated forward and backward with respect to the frames and being adjustable according to an angle difference of a door panel; and
    clamping units disposed on each angle adjusting unit and configured to clamp each clamping point of the door panel,
    wherein the frames include two upper frames and a lower frame, and wherein the frames are disposed in a "Y" shape; and
    the moving unit comprises:
    a main body disposed on each frame and having a slide hole formed therein;
    a LM rod inserted into the slide hole from an end of the main body, the LM rod having a first end in connection with the angle adjusting unit; and
    a drive motor disposed on an end of the main body, the drive motor in connection with the second end of the LM rod, and being configured to selectively move the LM rod back and forth.

2. The gripper of claim 1, wherein the frames are disposed at angles of about 120°.

3. The gripper of claim 1, wherein the LM rod comprises at least one guide rail formed exterior the circumference of the LM rod along the lengthwise direction of the LM rod.

4. The gripper of claim 3, wherein the main body comprises at least one rail groove formed interior the circumference of the slide hole, wherein the at least one rail groove corresponds to the at least one guide rail.

5. The gripper of claim 1, wherein the angle adjusting unit comprises:
    an air brake comprising a brake shaft, the air brake connected to the end of the LM rod;
    a swivel joint unit rotatably connected to an end of the air brake and to which the clamping unit is mounted; and
    a spring disposed on the brake shaft for supplying elastic force to the swivel joint unit.

6. The gripper of claim 5, wherein the swivel joint unit comprises:
    a mounting block having the clamping unit mounted to an exterior circumference thereof;
    guide blocks disposed on the mounting block spaced apart from each other;
    a rotation block disposed between the guide blocks, the rotation block being pivotable around a hinge shaft, in contact with the mounting block, and rotatably connected to the brake shaft; and
    a stopper disposed to prevent the mounting block from rotating over a predetermined angle.

7. The gripper of claim 6, wherein the rotation block comprises a contacting surface having a rounded shape.

8. The gripper of claim 6, wherein the stopper comprises:
    an insert protrusion disposed on the guide block and selectively protruded by supplying hydraulic pressure; and
    a slot formed in the rotation block, wherein the insert protrusion is selectively inserted therein.

9. The gripper of claim 8, wherein the insert protrusion and the slot are formed as a round shape.

10. The gripper of claim 6, wherein the clamping unit comprises:
    a locator having an end connected to the mounting block of the swivel joint unit;
    a clamping cylinder comprising a rod hingedly connected to the locator; and
    a clamper hingedly connected to an end of the locator and an end of the rod of the clamping cylinder.

11. The gripper of claim 10, wherein the locator and the clamper comprise respectively:
    a rotation pad for clamping the clamping point of the door panel; and
    a swivel ball for rotatably supporting the rotation pad.

* * * * *